March 3, 1942.  F. EBERHART  2,274,677
CONVEYING AND TREATING APPARATUS
Filed Oct. 20, 1939  3 Sheets-Sheet 1
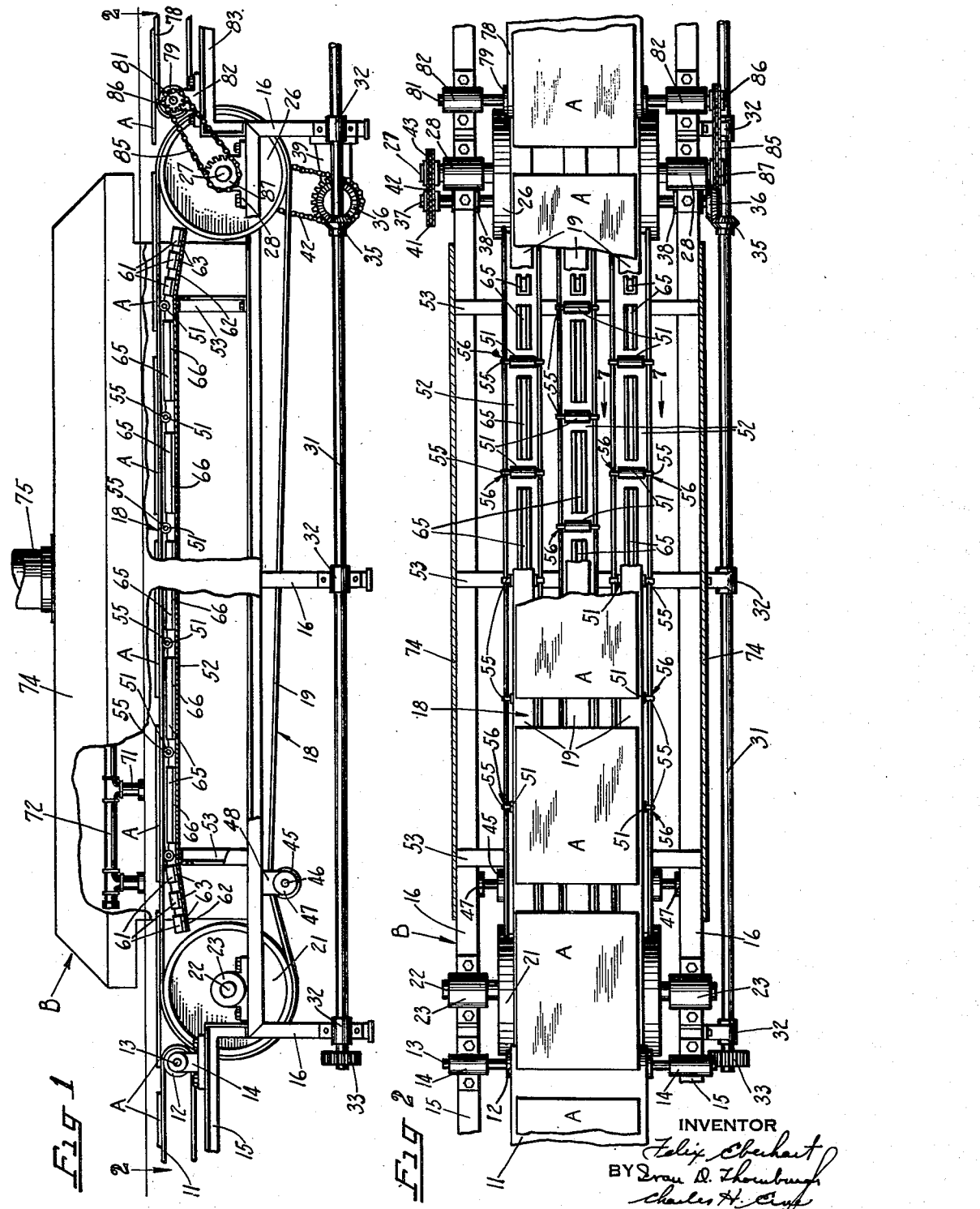
INVENTOR
Felix Eberhart
BY
ATTORNEYS

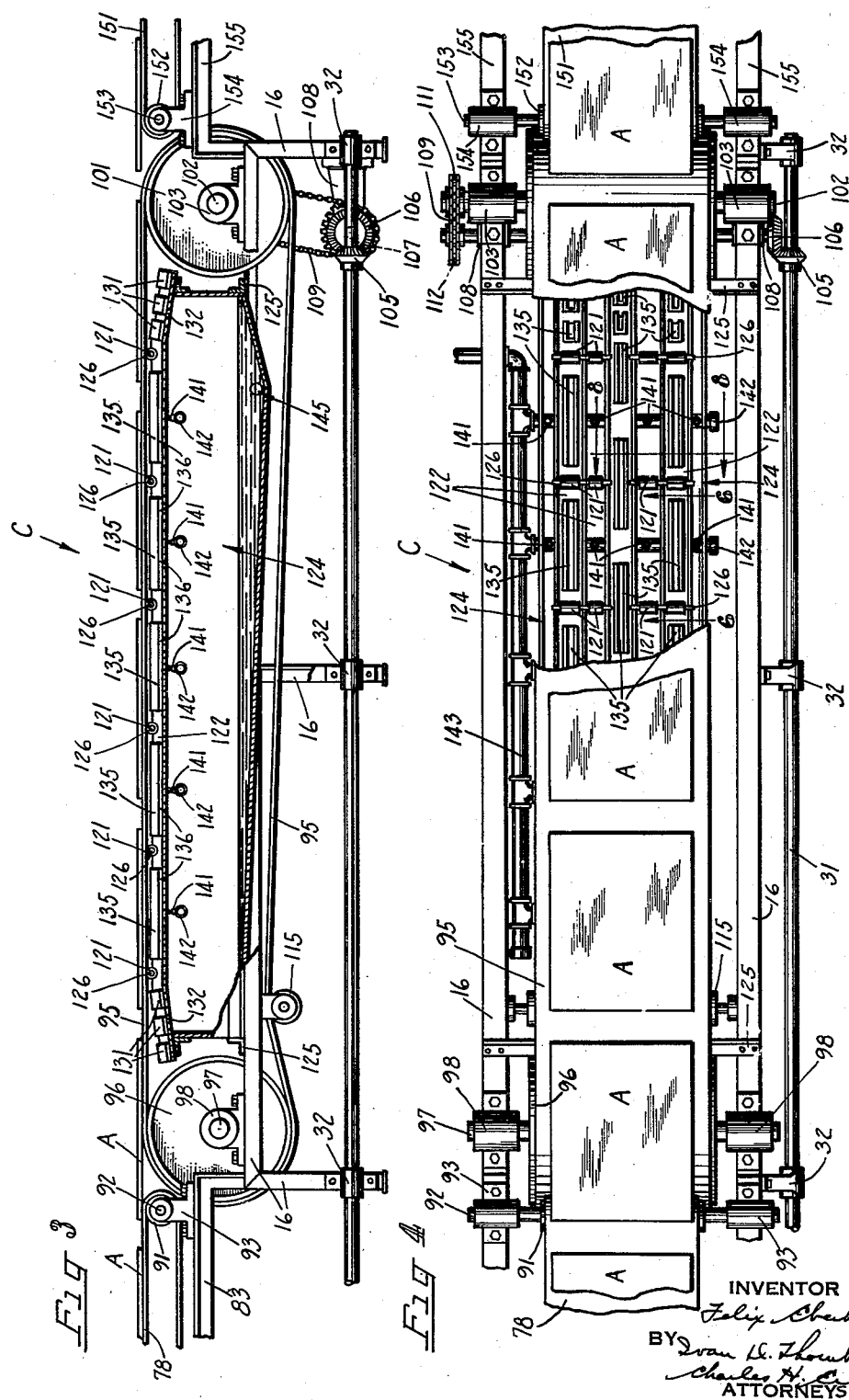

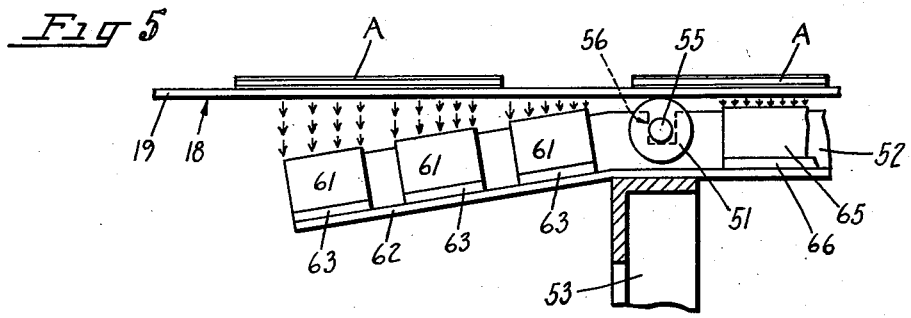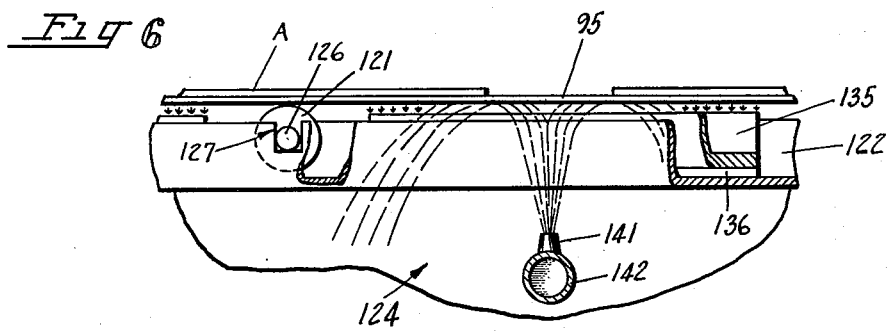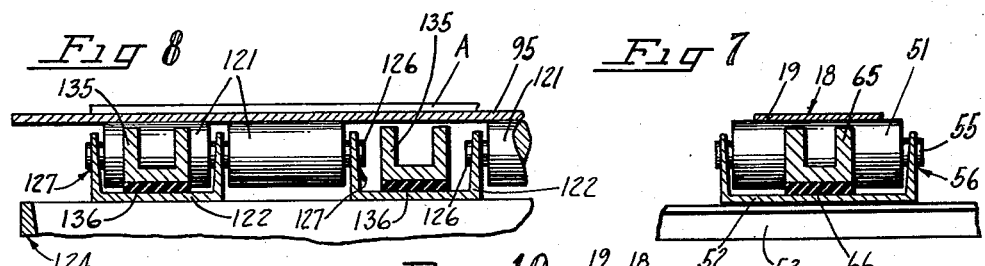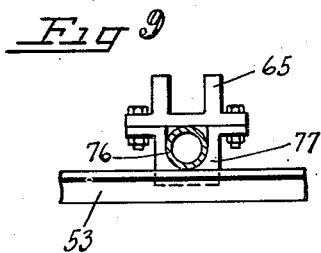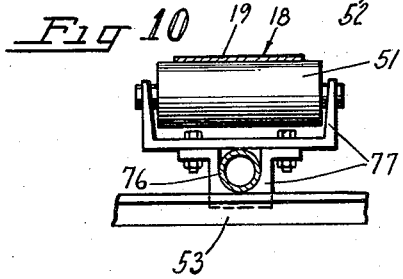

Patented Mar. 3, 1942

2,274,677

UNITED STATES PATENT OFFICE 2,274,677

CONVEYING AND TREATING APPARATUS

Felix Eberhart, Arlington, N. J., assignor to American Can Company, New York, N. Y., a corporation of New Jersey Application October 20, 1939, Serial No. 300,476

6 Claims. (Cl. 34—62)

The present invention relates to metallic sheet conveyors and the like and has particular reference to magnetically holding the sheets against displacement in a predetermined position on a non-magnetic conveyor while the latter conveys the sheets along a predetermined path of travel.

In the handling of flexible metallic sheets such as tin plate or the like a great deal of difficulty has been encountered in the past in bringing them into and in maintaining them in a predetermined position and against shifting on a conveyor while subsequent operations are being performed on them. Where the sheets have been coated or lithographed on the surfaces which engage the conveyor the shifting of the sheets scratches the coating and sometimes renders the sheets unfit for subsequent use.

The instant invention contemplates overcoming this difficulty by gradually and magnetically attracting the sheets to a non-magnetic conveyor and thereafter magnetically holding the sheets against shifting while the conveyor carries them past working stations at which certain operations may be performed on them.

An object therefore of the invention is the provision of a metallic sheet handling and treating machine wherein the sheets are conveyed on non-magnetic conveyors and upon entering upon and leaving the conveyors are gradually attracted to and gradually released from the conveyors so that the sheets will not shift on the conveyors thereby preventing scratching and marring of the sheets.

Another object is the provision in such a machine of devices for magnetically holding the sheets tightly in contact over their entire area and against the conveyor surface while they are traveling with the conveyor so that better heat transfer conditions between the conveyor and the sheets will obtain.

Another object is the provision in a machine of this character wherein the sheets while on the conveyor may be heated to obtain required results and then cooled to a desired temperature with a liquid cooling medium, the conveyor serving as a shield to protect the sheets against direct contact with the cooling medium and thereby eliminating a subsequent drying of the sheets.

Numerous other objects and advantages of the invention will be apparent as it is better understood from the following description, which, taken in connection with the accompanying drawings, discloses a preferred embodiment thereof.

Referring to the drawings:

Figure 1 is a side elevation of a portion of a machine embodying the instant invention, with parts broken away;

Fig. 2 is a top plan view taken substantially along a plane indicated by the line 2—2 in Fig. 1, parts being broken away and other parts being shown in section;

Fig. 3 is a side elevation showing a continuation of that portion of the machine illustrated in Fig. 1, with parts broken away and other parts shown in section;

Fig. 4 is a top plan view of the portion of the machine shown in Fig. 3, with parts broken away;

Fig. 5 is an enlarged longitudinal detail of devices shown at the left in Fig. 1, with parts broken away;

Fig. 6 is an enlarged detail taken substantially along a longitudinal vertical plane indicated by the line 6—6 in Fig. 4; with parts broken away;

Figs. 7 and 8 are transverse sectional details taken substantially along the lines 7—7, 8—8 in the respective Figures 2 and 4, with parts broken away; and Figs. 9 and 10 are sectional details similar to Fig. 7 and illustrating a modified form of supporting magnets and rollers used in the machine and elements for cooling the magnets, the views having parts broken away.

In the machine shown in the drawings as a preferred embodiment of the instant invention, metallic sheets A are received directly from a lithographed press or the like with their upper surfaces (as viewed in the drawings) newly lithographed and in a wet condition. For the purpose of more clearly explaining the invention the lower or opposite side of the sheets are preferably already coated, this coating having been applied prior to the sheets entering the lithographing press. The coating is dry but not sufficiently hard to prevent it from being easily scratched or marred by passing through the usual automatic machines.

The wet sheets after being received in the machine of the instant invention are conveyed through a baking oven B (Figs. 1 and 2) to dry the wet lithographing, the sheets being held against shifting or sliding to prevent scratching while being so conveyed. After such a drying operation the sheets are extremely hot and are therefore conveyed through a cooling mechanism C (Figs. 3 and 4) wherein a liquid cooling medium is used. During the travel of the sheets through this cooling operation they are again held against shifting to prevent scratching and are protected against direct exposure to the coolant. The dried and cooled sheets are thereafter discharged from the machine.

The wet sheets A are preferably conveyed from the lithographing press to the drying oven B on a horizontal endless feed-in belt 11 (Figs. 1 and 2) which may be operated in any suitable manner in time with the moving parts of the drying oven. The belt takes over a pulley 12 which is mounted on a cross-shaft 13 carried in bearing blocks 14 secured to frame brackets 15 bolted to a pair of spaced side frames 16 which constitute the main frame of the drying oven B.

In the drying oven the wet sheets are received on a horizontal drying conveyor 18 which comprises a plurality of spaced and parallel narrow endless non-magnetic belts 19 which extend the full length of the oven. These belts are preferably made of stainless steel which is a non-magnetic material.

At the entrance end of the oven, adjacent the feed-in belt 11, the conveyor 18 takes over a wide pulley 21 disposed between the oven side frames 16. The pulley is mounted on an idler cross-shaft 22 journaled in bearings 23 secured to the oven side frames. The upper run of the conveyor is disposed in the same plane as the feed-in belt 11 so that the incoming sheets readily run off of the belt onto the conveyor without the aid of a transfer device. At the opposite or discharge end of the oven the conveyor 18 takes over a wide pulley 26 which is also disposed between the side frames 16 and is mounted on a driving cross-shaft 27 journaled in bearings 28 secured to the side frames.

The pulley 26 and hence the conveyor 18 which takes over it are actuated in time with the feed-in belt 11 by a driving mechanism which includes a main shaft 31 which extends the full length of the entire machine. This main shaft is journaled in bearings 32 secured to the side frame 16. At one end, at the left as viewed in Figs. 1 and 2, the shaft carries a driving gear 33 which in turn may be driven from any suitable source of power such as an electric motor or other prime mover.

Adjacent the conveyor drive pulley 26, the main shaft 31 carries a bevel gear 35 which meshes with and drives a bevel gear 36 mounted on one end of a cross-shaft 37 journaled in bearings 38 formed in brackets 39 secured to the side frames 16. At its opposite end, the cross-shaft carries a sprocket 41 and endless chain 42. This chain takes over a sprocket 43 mounted on the pulley shaft 27 and it is this sprocket which directly rotates the pulley.

The conveyor 18 is maintained in a taut condition by a belt tightener pulley 45 which engages against the lower runs of the conveyor belts. This tightener pulley is mounted on a cross shaft 46 carried in bearings 47 formed in brackets 48 adjustably secured to the machine side frames 16.

The upper runs of the conveyor belts are supported against sagging by a plurality of rollers 51 which are carried in horizontal channel beams 52. There are preferably three of these beams, one disposed under each of the conveyor belts 19. They extend the full length of the oven between the conveyor pulleys and are supported on cross beams 53 which are secured to the main side frames. The rollers extend transversely of the channel beams and are formed with trunnions 55 which operate in notches 56 (see also Fig. 5) formed in the vertical legs of the beams. These rollers are arranged in a staggered spaced relation throughout the area between the conveyor pulleys so that the conveyor belts will be amply supported.

As a sheet to be dried travels along with the conveyor 18, it is carried over a magnetic field which first gradually draws the sheet down tightly against the conveyor in a manner which will prevent the sheet jumping ahead and secondly which will hold the sheet in such position and prevent any shifting relative to the conveyor while traveling along its path of travel. At the discharge end of the oven the attracted sheet is again gradually and gently released so that it may be transferred to another conveyor for further advancement. This prevents scratching of the sheet or the under coating thereon as hereinbefore mentioned.

The gradual and gentle magnetic attraction and release of the sheet is effected by a plurality of short permanent magnets 61 (Figs. 1 and 5) which are secured in an inclined fashion to inclined end portions 62 of the channel beams 52. These magnets are preferably of U-shaped cross-section and are insulated from the beams by insulating spacer blocks 63. This arrangement is identical at both ends of each of the channel beams.

The inclined location of the magnets results in a magnetic field which in the plane of the conveyor varies in intensity from a weak magnetic pull directly over the lowermost disposed magnet to a pull of almost full strength over the uppermost edge of the top magnet in the incline. Hence when an incoming sheet travels over the magnetic field at the entrance end of the oven the intensity of the magnetic pull increases as the sheet advances and hence the moving sheet is gradually and gently attracted to the stainless steel non-magnetic conveyor in a manner which prevents jumping ahead or sliding on the conveyor. This condition of increasing intensity is graphically indicated in Fig. 5 by the short arrows shown in this figure.

In a similar but reversed manner the sheet is released from the conveyor. Here as the sheet passes over the magnetic field adjacent the discharge end of the oven the intensity of the magnetic pull decreases as the sheet advances and hence the magnetic attraction on the sheet is gradually and gently diminished until the sheet is completely released, i. e., free on the conveyor.

Between the entrance and discharge ends of the magnetic field the sheet is held firmly against the conveyor by a plurality of long permanent magnets 65 which create a magnetic field preferably of uniform intensity. These magnets are arranged in staggered formation between the supporting rollers 51 and are secured to the channel beams 53. Each magnet is insulated from its beam by an insulating spacer block 66 (Figs. 5 and 7). Electro-magnets may be used in place of the long permanent magnets 65 and also in place of the short permanent magnets 61.

During the travel of the sheet across the magnetic field its wet lithographing is dried or baked. This is effected by a plurality of heating elements 71 (Fig. 1) which are arranged over the path of travel of the sheets. These heating elements are preferably gas operated and are accordingly connected to a main supply pipe 72 which leads to any suitable source of gas, such as a tank or reservoir. A hood 74 is provided over the conveyor to conserve the heat created therein and to confine volatile fumes from the lithograph ink solvents. This hood is secured to the main side frames 16. At the top of the hood a vent or outlet pipe 75 is formed in the hood.

The magnets 61, 65 located within the oven B are subjected to considerable heat from the heating elements 71 but under normal conditions this heat has no deleterious effect on them. However, in special cases extremely high temperatures may be required and such temperatures may impair the magnetic properties of the magnets and thereby lessen their usefulness for the purpose for which they are designed. To overcome this difficulty provision may be made for cooling the magnets. For this purpose Figs. 9 and 10 show a modified form of construction in which the channel beams 52 may be replaced by brass pipes 76 for the circulation of cold water or the like. The pipes are supported on the cross beams 53, while the magnets and the rollers 51 may be supported on the cooling pipes by brass clamping brackets 77.

When the dried hot sheets reach the end of the oven conveyor 18 they run off onto a transfer feed belt 78 (Figs. 1, 2, 3 and 4) which carries the sheets away from the oven and transfers them into the cooling mechanism C. Adjacent the oven B the belt 78 takes over a pulley 79 mounted on a cross shaft 81 journaled in bearing brackets 82 secured to a raised portion 83 of the machine side frames 16. The cross shaft is driven by a chain 85 which takes over a sprocket 86 mounted on the belt cross shaft 81 and which also takes over a driving sprocket 87 mounted on the oven conveyor shaft 27. Hence the transfer belt is operated in time with the oven conveyor.

Adjacent the cooling mechanism C the transfer belt 78 takes over an idler pulley 91 (Fig. 3) which is mounted on a cross shaft 92 journaled in bearing blocks 93 secured to the raised portion of the main side frames 16.

The cooling mechanism C is similar in certain respects to the oven mechanism B and includes a horizontal sheet conveyor 95 (Figs. 3 and 4) which forms a continuation of conveyor from the transfer belt 78. The upper run of the cooling conveyor is disposed in the same plane as the upper run of the transfer belt so that the sheets will readily run off the transfer belt onto the conveyor without the aid of a transfer device.

The cooling conveyor 95 extends the full length of the cooling mechanism. At the entrance end of the mechanism the conveyor takes over an idler pulley 96 which is mounted on a transverse shaft 97 journaled in bearing blocks 98 secured to the side frames 16. At the opposite or discharge end of the mechanism the conveyor takes over a driving pulley 101 which is mounted on a drive shaft 102 journaled in bearing blocks 103 secured to the side frames 16.

The driving pulley 101 is actuated from the main shaft 31. For this purpose the main shaft carries a bevel gear 105 which meshes with a bevel gear 106 mounted on a cross shaft 107 carried in bearing brackets 108 secured to the side frames 16. The cross shaft 107 drives the conveyor pulley shaft 102 through an endless chain 109 which takes over sprockets 111, 112 mounted on the respective shafts 102, 107.

The cooling conveyor 95 is preferably a single wide belt of non-magnetic material, preferably stainless steel, the width being sufficient to project beyond the edges of the sheets A to be carried on it. The conveyor is maintained in a taut condition by a belt tightener pulley 115 which engages against its lower run. This belt tightener is identical in construction and operation with the oven conveyor tightener pulley 45 hereinbefore described.

Sagging of the upper run of the cooling conveyor belt 95 is prevented by a plurality of supporting rollers 121 (Figs. 3, 4, 6 and 8) which are disposed in horizontal channel beams 122 arranged longitudinally of the machine between the cooling conveyor pulleys 96, 101. There are preferably three of these beams and they are disposed directly under the conveyor and are supported on the top edges of an open top drain tank 124. The tank in turn is supported on cross beams 125 which are bolted to the machine side frames 16. The supporting rollers 121 extend in transverse rows between the vertical legs of the channel beams and across the spaces between the beams as best shown in Figs. 4 and 8. These rollers are mounted in pairs on short transverse shafts 126 which operate in notches 127 formed in the vertical legs of the channel beams.

The cooling conveyor 95 carrying the sheets A to be cooled along their path of travel passes over a magnetic field which gradually attracts the sheets to the conveyor as they enter the field and which release the sheets as they leave the field in the same manner which has been hereinbefore described in connection with the oven mechanism B. This magnetic attraction for the sheets is effected by a plurality of short permanent magnets 131 (Fig. 3) which are arranged in an inclined position on inclined end sections 132 of the channel beams 122. It is believed the description hereinbefore given of these will suffice for both mechanisms.

The holding of the sheets against shifting while traveling with the cooling conveyor 95 is brought about by a plurality of long permanent magnets 135 which have a U-shaped cross section similar to the magnets 65 hereinbefore mentioned. These magnets are arranged in staggered positions on the channel beams 122 between the supporting rollers 121 and are insulated from the beams by insulating spacer blocks 136. The magnets extend up adjacent the non-magnetic conveyor but do not touch it and create a magnetic field of uniform intensity.

Thus when an attracted sheet on the conveyor passes over the magnetic field of uniform intensity the entire sheet is drawn down flat and tight against the top surface of the conveyor. In this position against the conveyor the best of heat transfer conditions obtain between the conveyor and the sheet and it is while the sheet is in this position that it is cooled. Thus it will be seen that the maximum conduction of heat is the direct result of the close contact between conveyor and sheet brought about by the constant magnetic pull.

The cooling of the sheet A is effected by projecting a cooling medium against the under side of the upper run of the conveyor. Cold water as a cooling medium has been found entirely satisfactory and this is shown in the drawings as an illustration of the cooling step. Hence the cooling effect on the conveyor is immediately transferred by conduction to the sheet and the latter is thereby cooled to a desired temperature as it moves with the conveyor.

The cooling medium is preferably discharged from nozzles 141 which extend up between the channel beams 122 in transverse rows. The drawings show four of these nozzles in each row and they are secured in transverse feed pipes 142 which are disposed in the drain tank 124.

The feed pipes extend outside of the tank and are connected into a main supply pipe 143 which leads to any suitable source of supply of the cooling medium.

The cooling medium as it impinges against the conveyor 95 spreads over the entire under surface thereof and then falls back into the drain tank from which it is carried off by a drain pipe 145 (Fig. 3) secured in the tank near its bottom. Such water may be recirculated if this is found desirable. The conveyor being wider than the sheets carried on it protects them against direct exposure to the liquid cooling medium and thus prevents the sheets from becoming wet. This feature saves time and labor and eliminates a subsequent drying operation.

When the cooled sheets reach the end of their travel on the cooling conveyor 95, they are ready to be discharged from the machine. For this purpose a discharge belt 151 is located adjacent the discharge end of the machine. The upper run of the belt is in the same plane as the upper run of the cooling conveyor and hence the cooled sheets run off of the conveyor and onto the belt without the aid of any transfer device. The belt carries the sheets to any suitable place of deposit.

The discharge belt 151 takes over a pulley 152 mounted on a cross shaft 153 journaled in bearing blocks 154 secured to brackets 155 bolted to the machine side frames 16. This belt is actuated in any suitable manner in time with the cooling conveyor 95 so that the transfer of the sheets thereto may be effected without scratching or marring them.

While the drawings illustrate the conveyor for both the baking oven B and the cooling mechanism C in a horizontal position it will be obvious that the same magnetic holding of the sheets onto a vertical conveyor may be used. In other words, since the magnets hold the sheets A in flat condition against the conveyors it is immaterial whether the conveyors are moved in a horizontal plane or in a vertical plane.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a machine for handling and treating flexible metallic sheets, the combination of an endless non-magnetic belt conveyor for carrying the sheets along a predetermined path of travel along an outer run thereof, a plurality of magnets arranged at an angle to said conveyor run adjacent an end thereof and at progressively increasing distances therefrom relative to the plane and outwardly of the conveyor run for creating at said conveyor end a magnetic field of progressively varying intensity for gradually influencing the sheets received by the conveyor to prevent jumping and shifting of the sheets on said conveyor during a treating operation, a second plurality of magnets arranged adjacent and parallel to said conveyor adjacent said angularly disposed magnets for creating a magnetic field of uniform intensity to hold the sheets on the moving conveyor run in a flat condition against shifting, and means disposed adjacent said sheet carrying conveyor run for imparting treatment to the exposed outer surfaces of said sheets while they are held to the conveyor by said magnets.

2. In a machine for handling and treating flexible metallic sheets having exposed treated surfaces, the combination of an endless non-magnetic belt conveyor for carrying the sheets along a predetermined path of travel along an outer run thereof, a plurality of magnets arranged at an angle to said conveyor run adjacent opposite ends thereof and at progressively increasing distances therefrom relative to the plane of the conveyor run, said magnets at the receiving end of the conveyor being spaced progressively closer to the conveyor run for creating at said receiving end a magnetic field of progressively increasing intensity for gradually attracting to the conveyor sheets received thereon to prevent the sheets from jumping ahead and sliding on the conveyor during a treating operation, said magnets at the discharge end of the conveyor being spaced progressively away from the conveyor run for creating at said discharge end a magnetic field of progressively decreasing intensity for gradually releasing the magnetic pull on the sheets so that they may be readily discharged from the conveyor, a plurality of intermediate magnets arranged adjacent and parallel to said conveyor between said angularly disposed magnets for creating a magnetic field of uniform intensity to hold the sheets on the moving conveyor run in a flat condition against shifting, and means disposed adjacent said sheet carrying conveyor run for imparting treatment to the exposed outer surfaces of said sheets while they are held to the conveyor by said magnets.

3. In a machine for handling and heat treating flexible metallic sheets having exposed wet coated surfaces, the combination of an endless non-magnetic belt conveyor for carrying the sheets along a predetermined path of travel along an outer run thereof, a plurality of magnets arranged at an angle to said conveyor run adjacent opposite ends thereof and at progressively increasing distances therefrom relative to the plane of the conveyor run, said magnets at the receiving end of the conveyor being spaced progressively closer to the conveyor run for creating at said receiving end a magnetic field of progressively increasing intensity for gradually attracting to the conveyor sheets received thereon to prevent the sheets from jumping ahead and sliding on the conveyor during the heat treating operation, said magnets at the discharge end of the conveyor being spaced progressively away from the conveyor run for creating at said discharge end a magnetic field of progressively decreasing intensity for gradually releasing the magnetic pull on the sheets so that they may be readily discharged from the conveyor, a plurality of intermediate magnets arranged adjacent and parallel to said conveyor between said angularly disposed magnets for creating a magnetic field of uniform intensity to hold the sheets on the moving conveyor run in a flat condition against shifting, and means disposed adjacent said sheet carrying conveyor run for heating the exposed wet coated surfaces of said sheets while they are held to the conveyor by said magnets.

4. In a machine for handling and heat treating flexible metallic sheets having exposed freshly lithographed surfaces and inner unexposed dry coated surfaces, the combination of an endless non-magnetic belt conveyor for carrying the sheets along a predetermined path of travel along an outer run thereof, a plurality of permanent magnets arranged at an angle to said conveyor run adjacent the receiving and discharge ends thereof and at progressively increasing distances therefrom relative to the plane of the conveyor run, said magnets at the receiving end of the conveyor being spaced progressively closer to the conveyor run for creating at said receiving end a magnetic field of progressively increasing intensity for gradually attracting to the conveyor sheets received thereon to prevent the sheets from jumping ahead and sliding on the conveyor and scratching or marring the inner unexposed dry coated surfaces of the sheets, said magnets at the discharge end of the conveyor being spaced progressively away from the conveyor run for creating at said discharge end a magnetic field of progressively decreasing intensity for gradually releasing the magnetic pull on the sheets so that they may be readily discharged from the conveyor, a plurality of intermediate permanent magnets arranged adjacent and parallel to said conveyor between said angularly disposed magnets for creating a magnetic field of uniform intensity to hold the sheets on the moving conveyor run in a flat condition against shifting, and a baking oven disposed adjacent said sheet carrying conveyor run for heating the exposed freshly lithographed surfaces of said sheets while they are held to the conveyor by said permanent magnets.

5. In a machine for cooling heated flexible metallic sheets having exposed heat dried surfaces, the combination of an endless non-magnetic belt conveyor for carrying the sheets along a predetermined path of travel along an outer run thereof, a plurality of magnets arranged at an angle to said conveyor run adjacent opposite ends thereof and at progressively increasing distances therefrom relative to the plane of the conveyor run, said magnets at the receiving end of the conveyor being spaced progressively closer to the conveyor run for creating at said receiving end a magnetic field of progressively increasing intensity for gradually attracting to the conveyor sheets received thereon to prevent the sheets from jumping ahead and sliding on the conveyor during the cooling operation, said magnets at the discharge end of the conveyor being spaced progressively away from the conveyor run for creating at said discharge end a magnetic field of progressively decreasing intensity for gradually releasing the magnetic pull on the sheets so that they may be readily discharged from the conveyor, a plurality of intermediate magnets arranged adjacent and parallel to said conveyor between said angularly disposed magnets for creating a magnetic field of uniform intensity to hold the sheets on the moving conveyor run in a flat condition against shifting, and means disposed inwardly of said sheet carrying conveyor run for projecting a fluid cooling medium against the inner surface of said conveyor run to cool by conduction the heated sheets magnetically held to the opposite side of said run.

6. In a machine for heating and cooling flexible metallic sheets having exposed freshly lithographed surfaces and inner unexposed dry coated surfaces, the combination of a pair of longitudinally spaced and aligned endless non-magnetic belt conveyors for successively carrying the sheets along a predetermined path of travel along outer runs thereof, a plurality of magnets arranged at an angle to each of said outer conveyor runs adjacent the receiving and discharge ends thereof and at progressively increasing distances therefrom relative to the plane of the conveyor runs, said magnets at the receiving end of a said conveyor being spaced progressively closer to the conveyor run for creating at said receiving end a magnetic field of progressively increasing intensity for gradually attracting to the conveyor sheets received thereon to prevent the sheets from jumping ahead and sliding on the conveyor and scratching or marring the inner unexposed dry coated surfaces of the sheets, said magnets at the discharge end of the conveyor being spaced progressively away from the conveyor run for creating at said discharge end a magnetic field of progressively decreasing intensity for gradually releasing the magnetic pull on the sheets so that they may be readily discharged from the conveyor, a plurality of intermediate magnets arranged adjacent and parallel to said conveyor between said angularly disposed magnets for creating a magnetic field of uniform intensity to hold the sheets on the moving conveyor run in a flat condition against shifting, a baking oven disposed adjacent said sheet carrying run of the first conveyor for heating the exposed freshly lithographed surfaces of said sheets while they are held to the conveyor by said magnets, and means disposed inwardly of the sheet carrying run of the second aligned conveyor for projecting a fluid cooling medium against the inner surface of the conveyor run to cool by conduction the heated sheets magnetically held to the opposite side of said run.

FELIX EBERHART.